No. 696,144. Patented Mar. 25, 1902.
A. DE KHOTINSKY.
CIRCUIT TESTER.
(Application filed Aug. 1, 1901.)
(No Model.) 2 Sheets—Sheet 1.

WITNESSES:
INVENTOR:
Achilles de Khotinsky,
BY
ATTORNEY.

No. 696,144. Patented Mar. 25, 1902.
A. DE KHOTINSKY.
CIRCUIT TESTER.
(Application filed Aug. 1, 1901.)
(No Model.) 2 Sheets—Sheet 2.

WITNESSES:
J. H. Skinkle
Matt S. J. Thornton

INVENTOR:
Achilles de Khotinsky,
BY George P. Barton
ATTORNEY.

UNITED STATES PATENT OFFICE.

ACHILLES DE KHOTINSKY, OF CHICAGO, ILLINOIS, ASSIGNOR TO COPENHAGEN AUTOMATIC FIRE ALARM COMPANY, OF SHEBOYGAN, WISCONSIN, A CORPORATION OF WISCONSIN.

CIRCUIT-TESTER.

SPECIFICATION forming part of Letters Patent No. 696,144, dated March 25, 1902.

Application filed August 1, 1901. Serial No. 70,449. (No model.)

*To all whom it may concern:*

Be it known that I, ACHILLES DE KHOTINSKY, a subject of the Czar of Russia, residing at Chicago, in the county of Cook and State of Illinois, have invented a certain new and useful Improvement in Circuit-Testers, (Case No. 1,) of which the following is a full, clear, concise, and exact description.

My invention relates to a circuit-tester, and has for its object to provide an improved device adapted for use in connection with automatic fire-alarm circuits to detect and automatically record any breaks which may exist in any of the different circuits tested, so that the broken circuit may be immediately located and repaired and the system restored to its operative condition.

I will describe my invention by reference to the accompanying drawings, and the features which I regard as novel will be pointed out in the appended claims.

Figure 1:
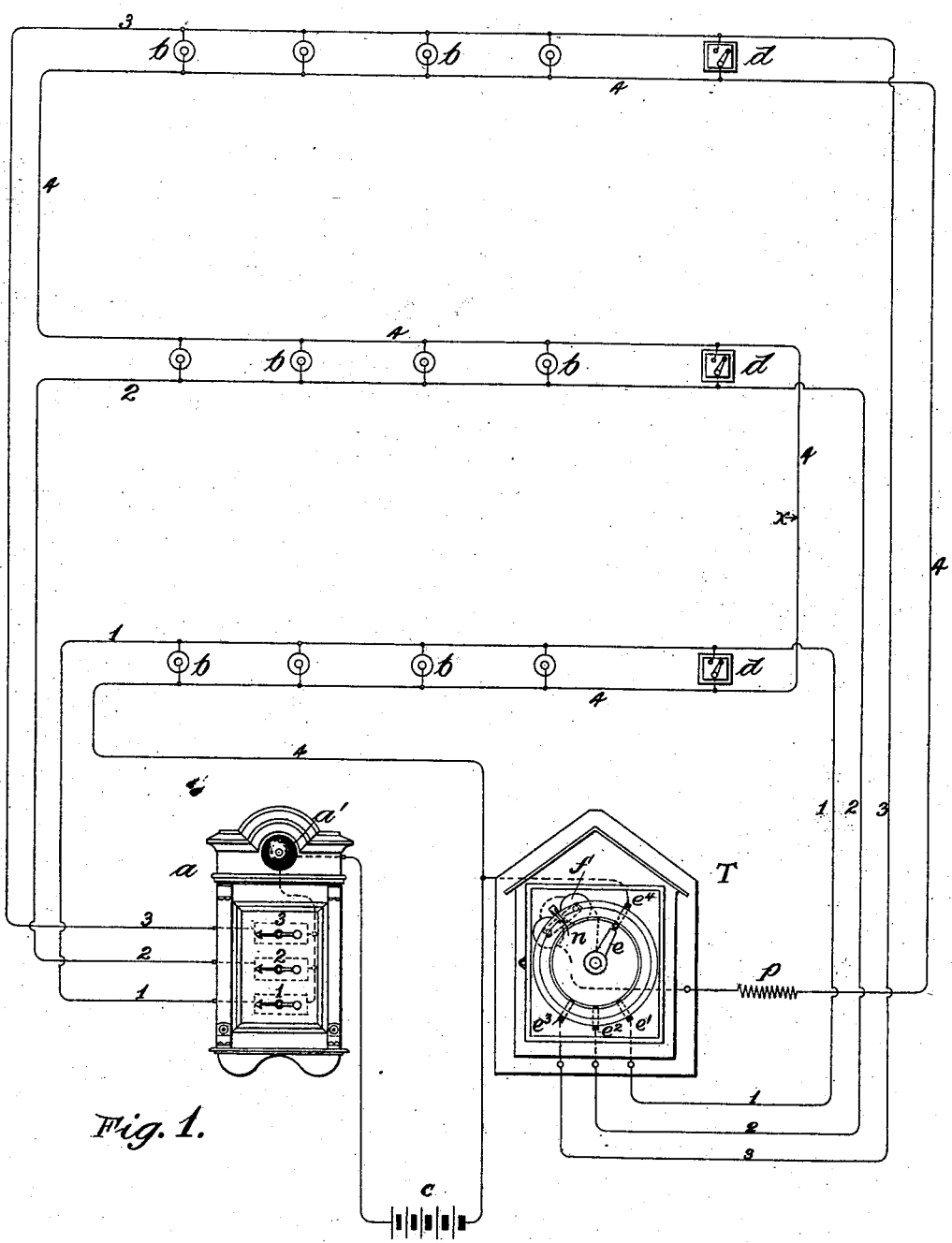
Figure 2:
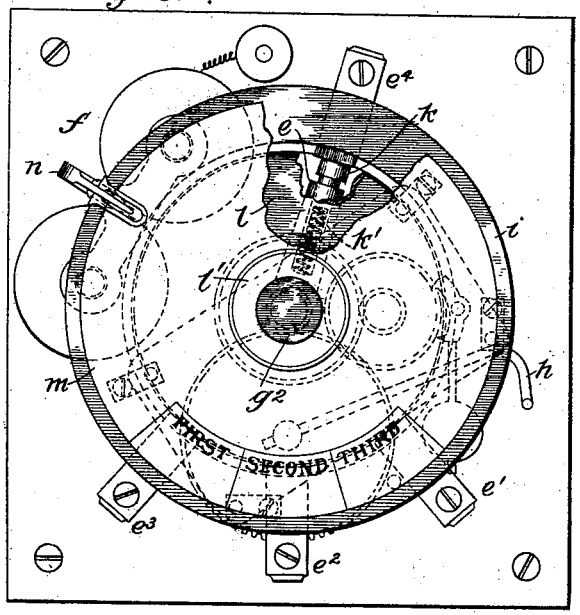
Figure 4:
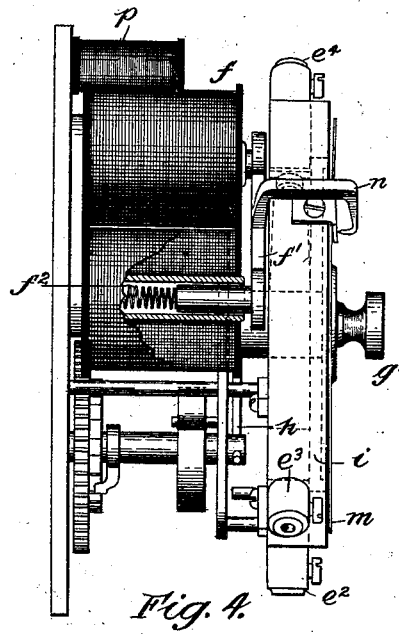
Figure 3:
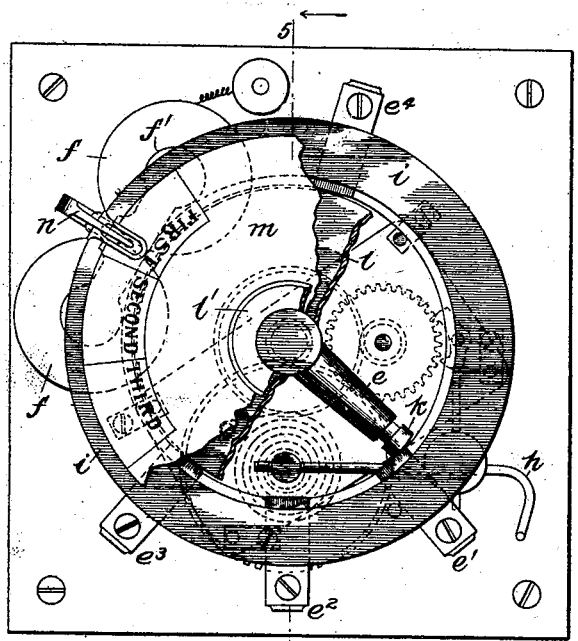
Figure 5:
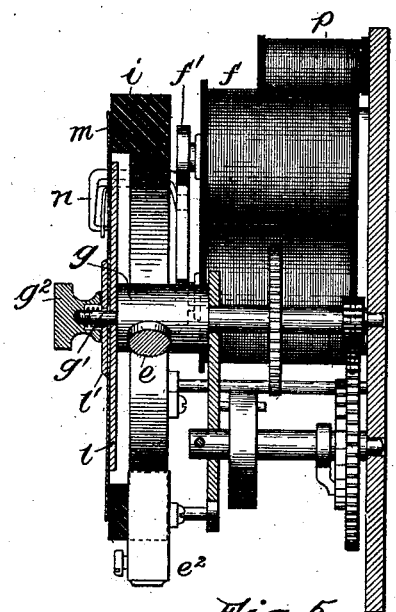
Figure 6:
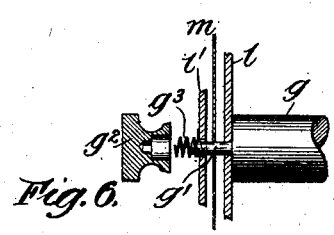

In the drawings, Figure 1 is a diagram illustrating an automatic fire-alarm circuit equipped with the improved testing device of my invention. Fig. 2 is a front elevation of the circuit-tester with some of the parts broken away to disclose other parts which underlie them. Fig. 3 is a similar view showing the parts in an alternative position. Fig. 4 is a side elevation, partially in section. Fig. 5 is a sectional elevation on line 5 5 of Fig. 3, and Fig. 6 is a detail view of a portion of the mechanism.

Similar letters of reference are used to designate the same parts wherever they are shown.

Referring first to Fig. 1, an automatic fire-alarm system, such as might be applied to a three-story building, is diagrammatically illustrated, three branch circuits 1 2 3 being shown extending from the annunciator and alarm device $a$ to the first, second, and third floors, respectively, of the building, each of said branch conductors being connected through thermostats $b\, b$, which are located on the different floors of the building, to a common return-conductor 4, which leads from one pole of the central battery $c$ to the several floors of the building, being connected at each floor with the multiple thermostats which control the particular branch circuit of that floor. The wires 1 2 3 are each led through an individual annunciator and through the signal-bell $a'$ to the opposite pole of battery $c$ from that to which conductor 4 is connected. The thermostats $b\, b$ may be of any desired type, the function of each being to automatically close the circuit between the return-conductor 4 and the particular one of the branch conductors 1 2 3 with which the thermostat in question may be associated whenever the temperature of the thermostat is raised to a given point, as by fire. Emergency-switches $d\, d$ are provided on each floor, by which the fire-alarm circuit of that floor may be closed in case some person on that floor should desire to transmit a fire-signal when for any reason the thermostats have not acted. Each of the branch wires 1 2 3 after passing the several thermostats which are associated with each of them passes back to a testing instrument T, which is shown in detail in Figs. 2 to 6. This testing instrument is provided with a rotatable arm $e$, which is adapted to be moved around by clockwork and successively to make engagement with contact-pieces $e'\, e^2\, e^3$, which form the terminals, respectively, of the branch conductors 1 2 3. The arm $e$ normally rests in contact with a terminal piece $e^4$, which is connected with the main wire 4 near the pole of the battery. The other end of the wire 4 after passing the several thermostats on all the floors also returns to the testing instrument T, where it is led through the windings of a recording-electromagnet $f$ to the framework of the machine, which is connected with the rotating contact-arm $e$.

Referring now more particularly to Figs. 2 to 6, the contact-arm $e$ is mounted to rotate with a shaft $g$, which forms one of the shafts of a gear-train adapted to be driven by a coiled spring and having an ordinary vibratory escapement. An operating lever or hook $h$ is connected by means of a pawl and ratchet with the shaft of the gear-train which carries the spring, so that by pulling down the lever $h$ the spring may be wound up, whereupon, the lever being released, the train will slowly rotate until the operating-lever is moved back to the starting-point. The range of movement of the lever $h$ is just sufficient so that the arm $e$, carried by the shaft $g$, will be caused to make a complete revolution. Surrounding the path in which the arm $e$ moves when rotated is a ring $i$, of insulating material, in which the terminal contact-pieces $e'$ $e^2$ $e^3$ $e^4$ are mounted. These contact-pieces are passed radially through the insulating-ring and project a trifle from the inner periphery thereof in position to be successively engaged by the extremity of the arm $e$ as it rotates. The arm $e$ has a separable contact-tip $k$, which is movable longitudinally of the arm, being shown as fitting into a hollow bore therein, and is normally pressed outward against the ring $i$ and the contact-terminals held therein by a spring $k'$, whereby a perfect electrical contact between the spring and the several contact-terminals is insured. A dial-plate $l$ is mounted upon the shaft $g$ above the arm $e$, but inside the insulating-ring $i$, and is adapted to rotate with the shaft. This dial-plate is provided for the purpose of carrying a detachable paper dial $m$, upon which a record of each test may be made. The recording device which I prefer to employ is an electromagnetically-operated punch $n$, adapted to perforate the paper dial at each test, if the circuit tested is complete. The dial is divided or marked off into a number of sections, one for each circuit, and as the dial is revolved the punch-mark is made in that division of the dial which corresponds to the circuit being tested. A permanent record of each test is thus made. In order that the paper may be stationary while the perforation is being made therein without requiring the rotation of the dial-plate $l$ to be stopped, the paper is not rigidly fastened to the dial-plate, but is merely slipped over a threaded pin $g'$, projecting from the shaft $g$, and is held lightly against the plate by a washer $l'$, which is also slipped over the threaded pin $g'$ and held down upon the paper by a thumb-nut $g^2$, screwed upon the pin, a spring $g^3$ being interposed between the nut and washer to insure a light and yielding engagement of the parts. The edge of the paper dial in which the perforations are to be made projects a little distance beyond the edge of the revolving dial-plate $l$, so as to slide over the surface of the insulating-ring $i$.

This testing instrument may be located at any convenient point; but preferably it is placed near the annunciator $a$.

Each of the conductors 1 2 3 starts from one pole of the battery $c$, leads through the bell $a'$ and an individual annunciator to the floor to be protected, where it is connected to one side of each of the several thermostats and the emergency-switch, and then continues on, passing back by another path to the testing instrument T, where it terminates in one of the contact-terminals $e'$ $e^2$ $e^3$. The conductor 4 starts out from the other pole of the battery and passes to all the floors, being connected to the several thermostats and the emergency-switch on each floor, then passes back to the testing instrument, where it is connected through the helices of the solenoid-magnet $f$ with the rotatable contact-lever $e$. This lever, as previously explained, normally rests against the contact-piece $e^4$, which is connected with the same pole of the battery from which the wire 4 originally started. The circuit of the battery may thus be completed by crossing the wire 4 at any point with one of the conductors 1 2 3, whereupon the alarm-bell $a'$ in the circuit will be rung and the particular indicator corresponding to that one of the conductors 1 2 3 which has been crossed with the return-wire will be caused to display its signal.

The punch $n$ is carried by the armature $f'$ of the solenoid-magnet $f$, and when the magnet is excited the punch is drawn down sharply against the face of the insulating-ring $i$, which forms a backing or anvil for it. The edge of the paper disk is interposed between the point of the punch and the face of the insulating-ring. The punch is held normally out of engagement with the paper by means of compression-springs $f^2$ $f^2$ inside the magnet-helices pressing outwardly against the inner ends of the solenoid-cores.

The helices of the magnet $f$, which preferably have but a comparatively small number of ampere-turns, are included in the circuit of conductor 4 between the arm $e$ and the protective circuits, so as to be in the path of current when the circuit of either of the branch circuits 1 2 3 is closed at the testing instrument. When a fire-signal is to be transmitted from one of the branch circuits 1 2 3, the current will normally flow from the branch circuit in question back to battery over the side of the loop-conductor 4, which does not include the windings of magnet $f$; but should this side of the loop be broken current may still find path back over the other side through the testing instrument.

A test of all the conductors of the system may be made at any time at the instrument T. In making this test a paper dial is fastened to the plate $l$ by the friction device already described, the dial being adjusted so that the divisions or spaces in which the record-marks are to be made will as the dial is rotated be brought under the punch when the latter is actuated by the completion of the corresponding circuit. The proper position of the dial at the start is shown in Fig. 2. The operating-lever $h$ is now pulled down to wind up the clock-train and then released, whereupon the shaft $g$ is slowly rotated until it has made one complete revolution, after which it is stopped, the operating-lever, which is slowly returned to its original position, finally striking a projecting lug, against which it normally rests. As the shaft rotates the contact-arm successively engages the contact-pieces $e'$ $e^2$ $e^3$, and as each contact is thus made, if the circuit tested is complete, the magnet will receive current and will attract its armature and so cause the punch to make a perforation in the paper dial in the division which corresponds to the circuit being tested. The paper dial is held from rotation by the punch while the latter is in engagement therewith; but the plate $l$ continues to rotate, the paper being only held lightly to the plate by the spring-washer, so that it is only carried around by the plate when free of the punch. Fig. 3 shows the position of the parts as the circuit 1 is being tested. When the arm $e$ has made a complete revolution, it is brought to rest against the contact $e^4$, leaving both ends of the loop 4 connected with the battery.

Should the return-conductor 4 be broken, say at the point $x$, it will be seen that although fire-signals may be transmitted, yet when the test is made neither the bell $a'$ nor any of the individual annunciators nor the magnet $f$ will be operated. If any of the conductors 1 2 3 should be broken, the alarm-bell $a'$ will not ring nor the annunciator be displayed when the contact-arm $e$ engages the terminal of that conductor, and the magnet $f$ will not be operated to punch the dial, although the other circuits may be complete. The dial will thus show the condition of each wire of the system at each test and makes a permanent record of that test, which may be preserved.

One feature of my invention consists in interposing a resistance $p$ in circuit with the recording-magnet $f$ and adjusting the magnet so that it will be responsive only to comparatively strong currents. The object of this is to furnish a test of the strength of the battery. If the battery should be run down or otherwise weakened, when the test is made the bell $a'$ and the annunciator will respond as usual, but the recording-magnet will not be energized sufficiently to operate the punch, and no record will be made. The attendant will thus be warned that the batteries need attention before they become so far exhausted that they will fail to transmit a fire-signal.

Having thus described my invention, I claim as new, and desire to secure by Letters Patent, the following:

1. In a testing device for protecting circuits, the combination with a movable contact-arm $e$, of a number of contact-pieces $e'$ $e^2$ $e^3$ with which said arm is adapted successively to engage, said contact-pieces forming the terminals, respectively, of the protective circuits to be tested, a movable dial or register mounted to rotate with the contact-arm, a return-conductor connected to said contact-arm, a source of current connected between said return-conductor and the several protective circuits, a magnet included in the circuit with said contact-arm, adapted to respond to the flow of current as each protective circuit is closed by said arm, and recording mechanism for marking said dial or register, operated by said magnet; whereby as the arm is moved the circuits are automatically tested one after another and a record automatically made of each test, as described.

2. In a circuit-testing device, the combination with the rotatable contact-arm $e$ and the terminal contact-pieces $e'$ $e^2$, &c., with which said arm is adapted successively to engage, a gear-train for rotating said contact-arm and means for driving the same, a rotatable dial $m$ and a mounting therefor moved by said gear-train, a source of current connected with the contact-arm and with each of the circuits to be tested, said circuits terminating respectively in the contact-pieces $e'$ $e^2$, &c., an electromagnet in the path of current between the contact-arm and the several circuits to be tested, and a punch $n$ operated by said magnet adapted to perforate said dial, whereby a permanent record of each test is automatically made as the arm and dial are rotated.

3. A recording device for a circuit-tester, comprising a magnet and means for successively connecting the same with the circuits to be tested, a movable dial-plate $l$ and mechanism for moving the same as the magnet is connected with one circuit after another, a paper dial $m$ and means for holding the same frictionally against said movable dial-plate, whereby the paper dial is moved with the plate but may be stopped independently thereof, and a recording-marker operated by said electromagnet, adapted to mark the paper to record the test while the dial-plate $l$ is in motion, as set forth.

4. The combination with an alarm-circuit, of a battery and an electrical alarm device in the circuit, a circuit-tester having a responsive device and means for connecting said responsive device in circuit with the battery and the alarm device, said alarm device being adjusted to respond to a current of less strength than that required to operate the responsive device of the circuit-tester, whereby weakening of the battery will be indicated by the failure of the responsive device to operate when the circuit is tested, while the battery is still sufficiently strong to operate the alarm device, as set forth.

5. A circuit-tester comprising the ring or frame $i$, contact-pieces disposed at intervals around the inner surface of said ring, a central shaft $g$ mounted to rotate within the ring and means for rotating said shaft, a contact-arm carried by said shaft, the outer end of said arm being engaged successively with the said contact-pieces of the ring as the arm is revolved, a dial-plate $l$ carried by the shaft, a detachable dial $m$ backed by said dial-plate, the outer edge of said dial extending beyond the edge of the dial-plate and sliding over the front surface of the ring, and a marking device for engaging such projecting edge of the dial, as described.

In witness whereof I hereunto subscribe my name this 29th day of July, A. D. 1901.

ACHILLES DE KHOTINSKY.

Witnesses:
C. G. MULLER,
M. J. HELMS.